April 7, 1970 R. E. PHILLIPS 3,505,123

THERMOJUNCTION APPARATUS

Filed Sept. 29, 1965

INVENTOR
Robert E. Phillips

BY Shoemaker and Mattare
ATTORNEYS

United States Patent Office 3,505,123

Patented Apr. 7, 1970

3,505,123

THERMOJUNCTION APPARATUS

Robert Edward Phillips, P.O. Box 108A, King George Road, Bound Brook, N.J. 08805

Filed Sept. 29, 1965, Ser. No. 491,173
Int. Cl. H01v *1/30*
U.S. Cl. 136—205 1 Claim

ABSTRACT OF THE DISCLOSURE

The thermojunction apparatus comprises a first portion formed of electrically conductive material and a second portion formed of like electrically conductive material with means for causing the first and second portions to be maintained at different temperatures. An electrical lead means is connected with each of said first and second portions. A semiconductor comprising a body of cupric oxide connects the first portion to the second portion.

The present invention relates to new and novel thermojunction apparatus, and more particularly to apparatus which may function in a manner similar to a conventional thermocouple and which may serve as a thermoelectric generator.

The apparatus of the present invention is similar to the well known thermocouple apparatus, and may be employed in similar applications. Additionally, the structure of the present invention may be considered to be a thermoelectric generator capable of producing electric current when subjected to a certain heat environment as described hereinafter.

In contrast to a conventional thermocouple which employs a pair of metal strips formed of different metals which are closely joined as by welding or brazing and the like at one end of the strips, the present invention employs two separate and independent portions which need not be welded or brazed to one another and which are formed of substantially the same metallic substance. These two portions of the same metallic substance in the present invention are electrically interconnected by one another by a semiconductor disposed between and in contact with each of the portions.

Insulating means is provided in association with one of the portions which is adapted to be heated, and the other of the portions may be of tubular construction so that a suitable cooling medium may be introduced therethrough, whereby the two portions may be maintained at substantially different temperatures.

This difference in temperatures between the two portions of the thermojunction apparatus results in the generation of an electrical current, and as compared with a conventional thermocouple results in a substantial increase in voltage. The provision of the semiconductor between the two portions prevents a direct short circuit between these portions as occurs in an ordinary thermocouple. In a typical example wherein a conventional thermocouple construction would provide approximately one-tenth ($\frac{1}{10}$) of a volt output, a thermojunction apparatus according to the present invention and employing elements of a similar size will provide approximately seven-tenths ($\frac{7}{10}$) of a volt, whereby it is obvious that a very substantial increase in voltage is obtained.

The present invention also incorporates means in association with each of the portions of the thermojunction apparatus to maintain them at different temperatures. One of the portions is adapted to be maintained at an elevated temperature, and insulating means is provided for insulating the heated area from the other portion which is adapted to be maintained at a substantially lower temperature and which is of a tubular construction for receiving a suitable cooling medium such as air or the like.

The apparatus of the present invention is extremely simple and inexpensive in construction, and enables the manufacture of a thermojunction at a minimum cost.

An object of the present invention is to provide new and novel thermojunction apparatus which may be employed in place of conventional thermocouples and further which acts as a thermoelectric generator.

Another object of the invention is the provision of thermojunction apparatus which will provide a greater voltage than a comparable thermocouple under similar conditions.

Still another object of the invention is to provide thermojunction apparatus including means for heating one of the portions of the apparatus and maintaining such portion at an elevated temperature, and further means for cooling the other portion of the apparatus and maintaining said other portion at a substantially lower temperature than the first-mentioned portion.

Still a further object of the invention is to provide thermojunction apparatus which is quite simple and inexpensive in construction, eliminating the necessity of brazing or welding the portions together, and further which is efficient and reliable in operation.

Other objects and many attendant advantages of the invention will become more apparent when considered in connection with the specification and accompanying drawings, wherein.

Figure 1:
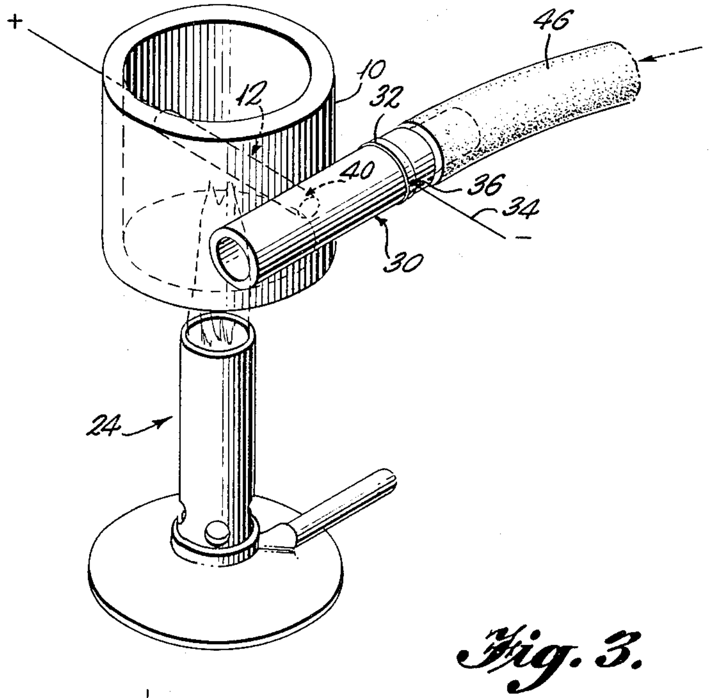
FIG. 1 is a top perspective view of an embodiment of the present invention.
Figure 2:
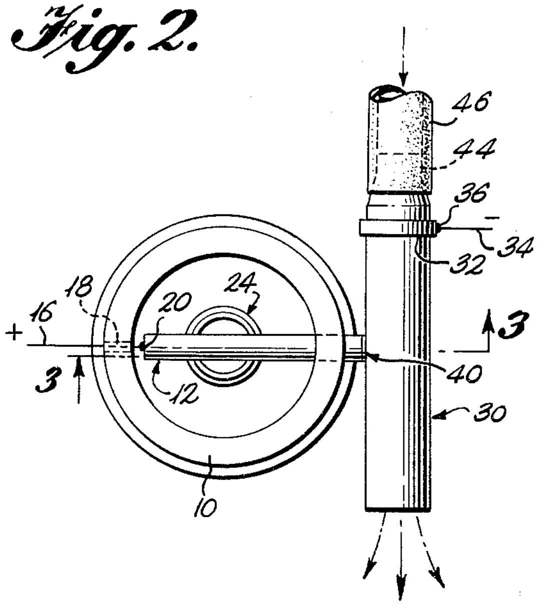
FIG. 2 is a top plan view of the structure shown in FIG. 1.
Figure 3:
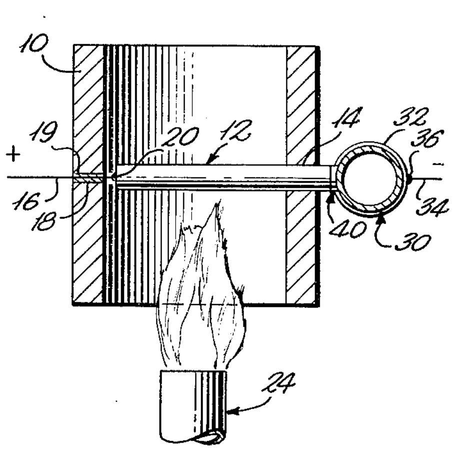
FIG. 3 is a cross sectional view taken substantially along line 3—3 of FIG. 2 looking in the direction of the arrows.

Referring now to the drawings wherein like reference characters designate corresponding parts throughout the several views, insulating means 10 in the form of a cylindrical member of suitable heat insulating material such as clay or the like is provided, and a first electrically conductive portion 12 of the thermojunction apparatus is supported within this insulating means. Portion 12 may for example comprise a solid rod formed of copper or similar material, this member extending through a hole 14 in the side wall of insulating means 10 and projecting outwardly of the insulating means.

An electrical lead 16 extends through a hole 18 in the insulating material and may be supported within such hole and maintained in place by a suitable body of sealing material 19 which closes the hole and provides a good thermal shield. Lead 16 is connected as indicated at 20 with portion 12 so as to provide an electrical connection therewith.

Suitable means may be provided for heating portion 12, and as illustrated, a conventional Bunsen burner is illustrated as being disposed immediately beneath the central portion of insulating means 10 so as to allow the heat from the burner to travel upwardly within the insulating means to heat rod 12 to a desired temperature which is in a typical example may be on the order of 1400° F. It will be understood that the insulating means 10 may be supported in operative position by any conventional support means.

The second electrically conductive portion of the thermojunction apparatus may comprise an elongated tubular member 30 which in a typical example is of a suitable electrically conductive material such as copper and the like. An electrically conductive band 32 is illustrated as being disposed about the outer surface of tube 30 and is connected with an electrical lead 34 at point 36. It will be understood that leads 16 and 34 may be connected in any suitable electrical circuit as desired. It should also be noted that heat insulating means may be disposed about tube 30 if so desired, so as to provide addiitonal heat insulation between the hot and cold junctions of the apparatus.

A semiconductor is provided between and in contact with the first and second portions of the thermojunction apparatus, and a body of semiconductor material is indicated generally by reference numeral 40. This material may comprise in a typical example cupric oxide which is disposed between the end of rod 12 and the outer surface of tube 20.

One end of tube 30 is necked down as indicated at 44 and is adapted to be inserted within an open end of a flexible tube 46 which may be connected with any suitable source of cooling medium such as air under pressure. In a typical example, tube 46 may be connected with air at a temperature of approximately 70° F., and under a pressure of approximately 5 ounces.

In operation, member 12 may be continuously heated by a suitable source of heat such as Bunsen burner 24, while member 30 may be continuously cooled by passing relatively cold air through the central bore formed therethrough. It is thought that the electrons of the hot junction 12 are excited by the heat applied thereto and pass through the semiconductor of cupric oxide and are absorbed by the negative conductor 30 which is relatively cold thereby creating an effective voltage and current.

It is apparent from the foregoing that there is provided according to the present invention new and novel thermojunction apparatus which is adapted to be used in place of conventional thermocouples and which can also act as a thermoelectrical generator for creating greater voltages than comparable thermocouple apparatus. The construction is quite simple and inexpensive eliminating the necessity for brazing or welding the members together, and yet the apparatus is at the same time efficient and reliable in operation. The apparatus includes hot and cold junctions and incorporates means for maintaining these injunctions at the proper temperatures to provide the desired end results.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by the claim.

I claim:

1. Thermojunction apparatus comprising a first electrically conductive portion and a second electrically conductive portion, said first and second electrically conductive portions comprising separate and independent means of substantially the same metallic substance, one of said portions being of horizontal tubular construction, means for introducing a cooling medium through said tubular portion, the other of said portions being a solid rod extending at substantially right angles from said tubular portion, a semiconductor comprising a body of cupric oxide disposed between the end of said rod and the side of said tubular portion and forming the joint therebetween, and an electrical connection therebetween, electrical leads operatively connected with each of said first and second portions, open-ended vertical tubular insulating means disposed in surrounding spaced relationship to the rod, said rod extending horizontally through a side wall of said tubular insulating means and normally traverses the longitudinal axis thereof, and means for introducing a source of heat within said insulating means so as to heat said other portion.

References Cited

UNITED STATES PATENTS

| | | | |
|---|---|---|---|
| 244,666 | 7/1881 | Randall | 136—211 |
| 1,893,748 | 1/1933 | Klopsteg | 136—200 X |
| 3,127,287 | 3/1964 | Henderson et al. | 136—205 X |
| 3,358,162 | 12/1967 | Krake et al. | 136—200 X |

FOREIGN PATENTS

| | | |
|---|---|---|
| 371,523 | 1/1907 | France. |
| 19,794 | 2/1908 | Great Britain. |

ALLEN B. CURTIS, Primary Examiner

M. J. ANDREWS, Assistant Examiner